United States Patent [19]

Long

[11] 4,416,485

[45] Nov. 22, 1983

[54] MULTIPLE USE: PONTOON BRIDGE SECTION

[76] Inventor: Alvin L. Long, Civilian Gen. Del., Beale A.F.B., Calif. 95903

[21] Appl. No.: 298,902

[22] Filed: Sep. 2, 1981

[51] Int. Cl.[3] ...................... B62D 25/00; B62D 29/00; B62D 33/00

[52] U.S. Cl. .................................. 296/188; 89/36 H; 114/14; 296/43; 296/100; 296/157

[58] Field of Search ................ 296/157, 100, 43, 187, 296/188; 89/36 J, 36 F, 36 H; 114/9–14

[56] References Cited

U.S. PATENT DOCUMENTS 1,273,515 7/1918 Makrenos ............................... 114/9

1,572,029 2/1926 Nelson et al. ........................ 296/43

3,473,839 10/1969 Elble ................................. 296/157

*Primary Examiner*—Sherman D. Basinger

[57] ABSTRACT

A complete section of pontoon bridge carried on a support structure that is applied to existing apertures on the cargo box of military trucks. The section of pontoon bridge forms a complete weather proof cover for the cargo box and leaves the cargo area free to carry other cargo. Bullet resisting pontoon bridge decking form the sides of the weather proof cover and an inverted pontoon forms the roof. With the section of pontoon bridge removed from its s truck, an armored assault boat can be constructed from the pontoon and decking. The decking is bolted together to form a cabin which in turn is inserted in the upright pontoon. With an outboard motor applied to the stern a motorized-armored assault boat is completed.

3 Claims, 7 Drawing Figures

MULTIPLE USE: PONTOON BRIDGE SECTION

SUMMARY OF THE INVENTION

The present invention relates to military trucks that have a cargo box with a canvas cover. Canvas covers for trucks have long been a source of irritation to personnel riding in them as wind and dust will penetrate canvas covers very easily.

The general object of the present invention is to provide a complete section of pontoon bridge carried by one truck and forming a weather proof cover for the cargo box. A support structure applied to existing apertures on the cargo box supports the section of pontoon bridge.

The sides of the weather proof cover are bullet resistant panels that can be removed from the support structure for use as pontoon bridge decking. The roof of the weather proof cover is an inverted pontoon.

The capacity of the cargo box is reduced very little by the application of the complete section of pontoon bridge, and the truck can be used to carry cargo until such time as the section of pontoon is needed.

Personnel riding in a truck with a pontoon bridge cover will be protected by the bullet resistant sides, and they will find that wind and dust do not penetrate the sides.

The advantages of the present invention over the prior art are: a truck can carry other cargo with the bridge section in place and cargo will be protected by bullet resisting sides. A canvas cover can be applied over the support structure after the section of pontoon bridge has been removed. In so doing any cargo in the cargo box will be protected even though the section of pontoon bridge is removed.

The section of pontoon bridge can be assembled into an armored assault boat, and the armored bridge decking is used to make an open top box which is inserted in the pontoon.

DETAILED DESCRIPTION OF THE DRAWINGS

Figure 1:
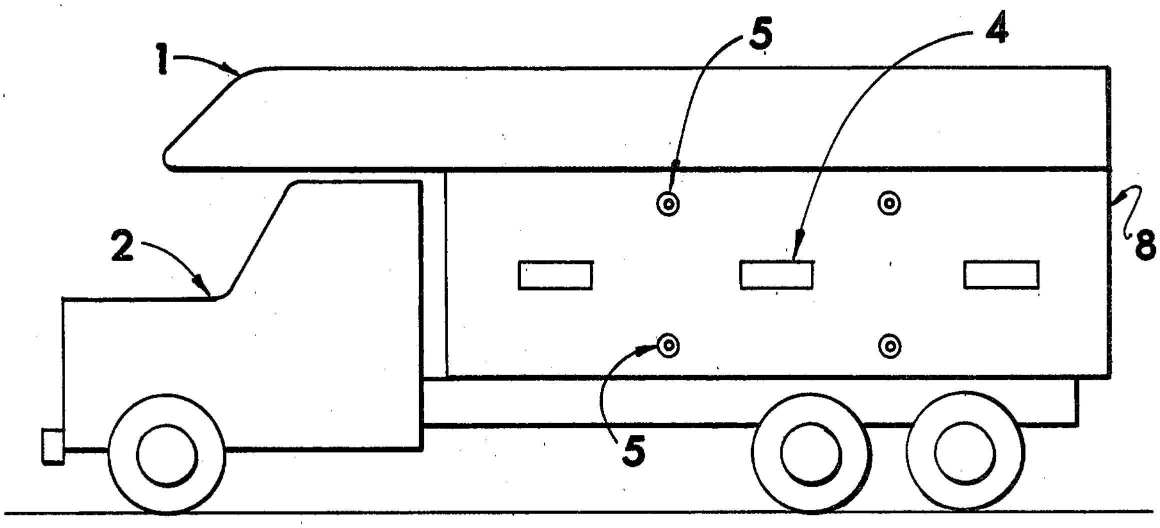
FIG. 1 is a side view of a military truck and, a section of pontoon bridge is shown forming the roof and sides of the cargo box.
Figure 5:
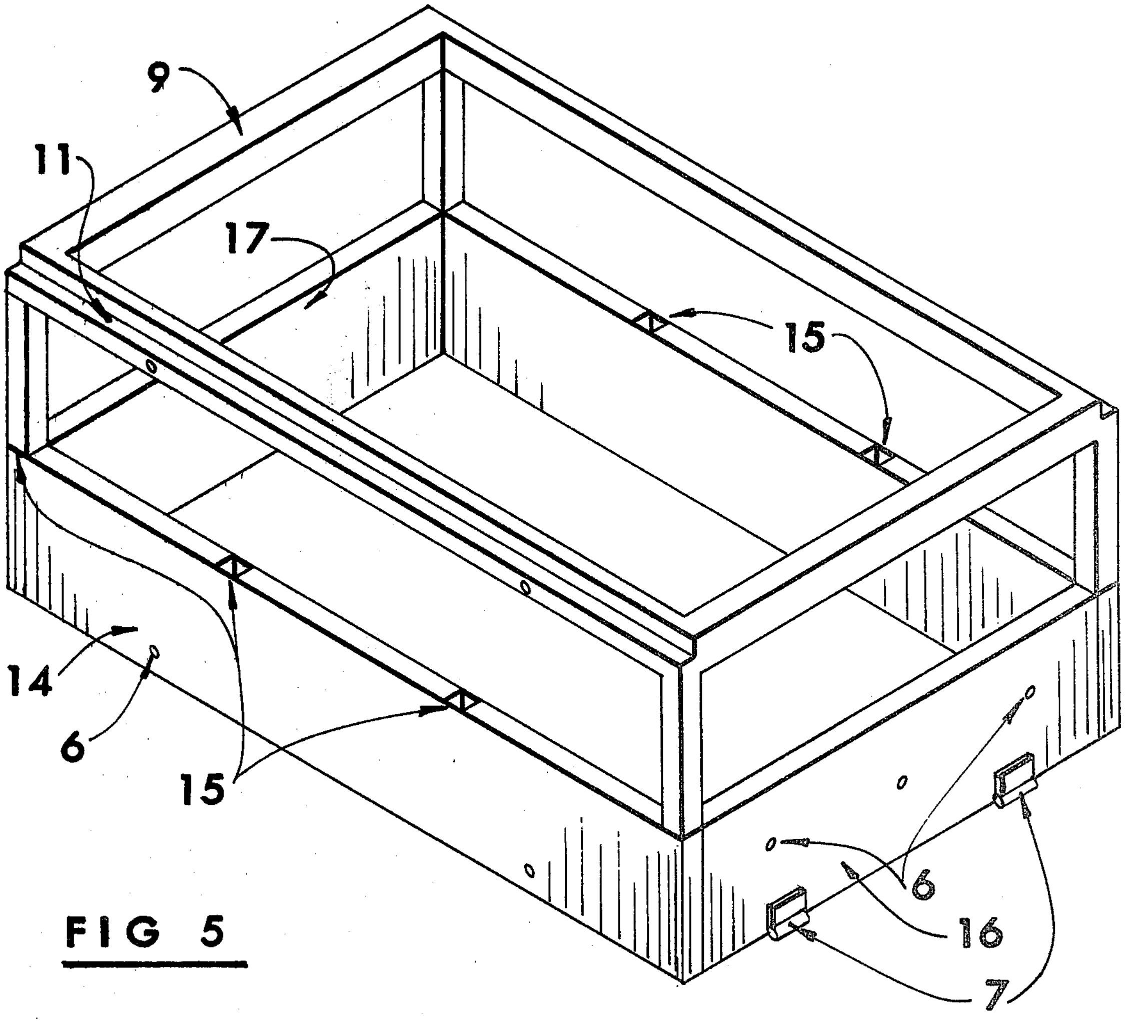
FIG. 5 is a cargo box of a truck, a support structure can be seen applied to existing apertures on the cargo box.

In the drawings FIG. 1 is a side view of a military truck 2 with a section of pontoon bridge 1 and 8 forming a weather resistant cover over the cargo box 14. In FIG. 5 a support structure 9 consisting of a metal framework with four depending legs, two longitudinally extending sides, and two laterally extending sides is shown inserted in existing apertures 15 on the cargo box 14 of a military truck 2. A pontoon 1 dimensioned to fit the recess grooves 11 on the top of the support structure 9 formes the roof for the cargo box 14. Bullet resistant decking 8 for the pontoon is bolted to the sides of the support structure 9 and to the cargo box 14 and forms the sides of the weather resistant cover for the cargo box 14.

In FIG. 1 the heads of the bolts 5 that hold the bullet resistant decking 8 on the support structure 9 can be seen. FIG. 5 shows threaded holes at 6 on the support structure 9 and cargo box 14 to receive the bolts 5 that hold the pontoon decking 8 on the cargo box 14. The bullet resistant pontoon decking 8 has gun ports 4 for use by personnel riding in the cargo box 14.

Figure 2:
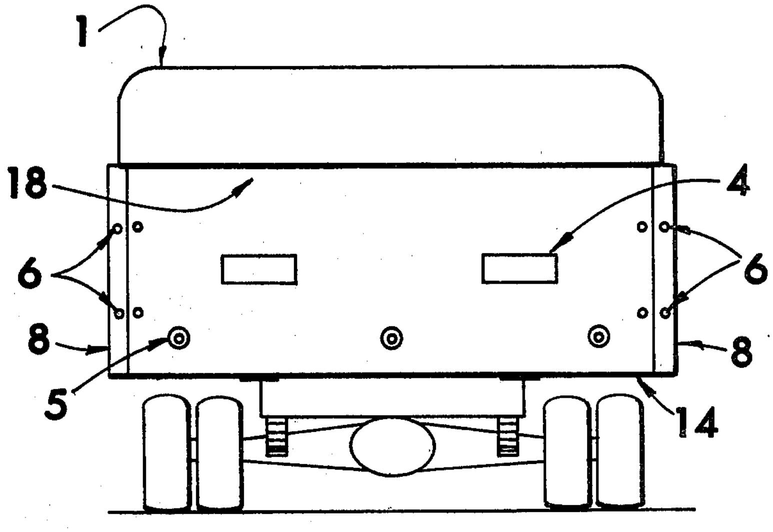
FIG. 2 is a back view of FIG. 1.

FIG. 2 is a back view of FIG. 1.

Figure 3:
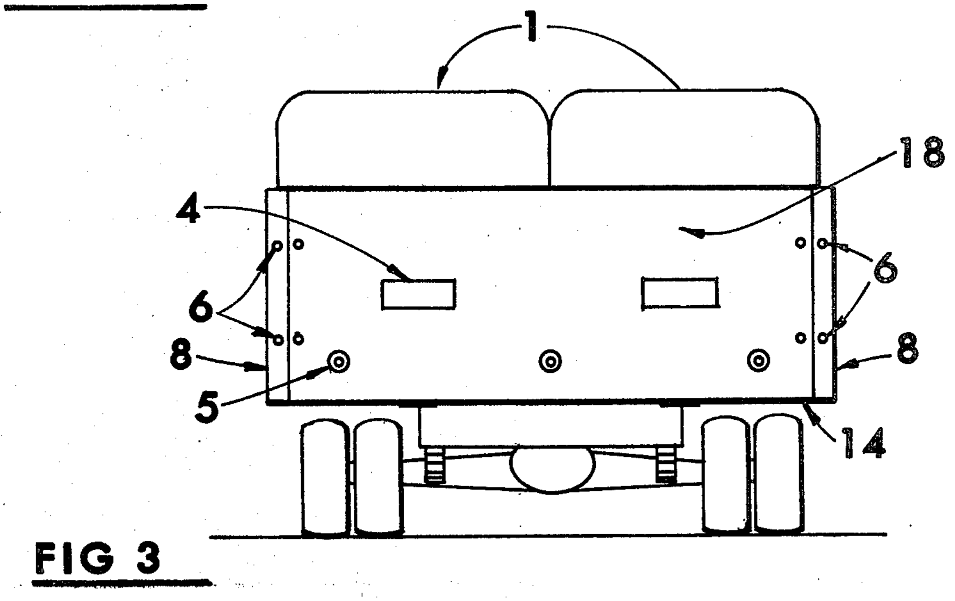
FIG. 3 is a back view of FIG. 1 and shows two pontoons forming the roof.

FIG. 3 is a back view of FIG. 1; however, in this case two pontoons form the roof.

Figure 6:
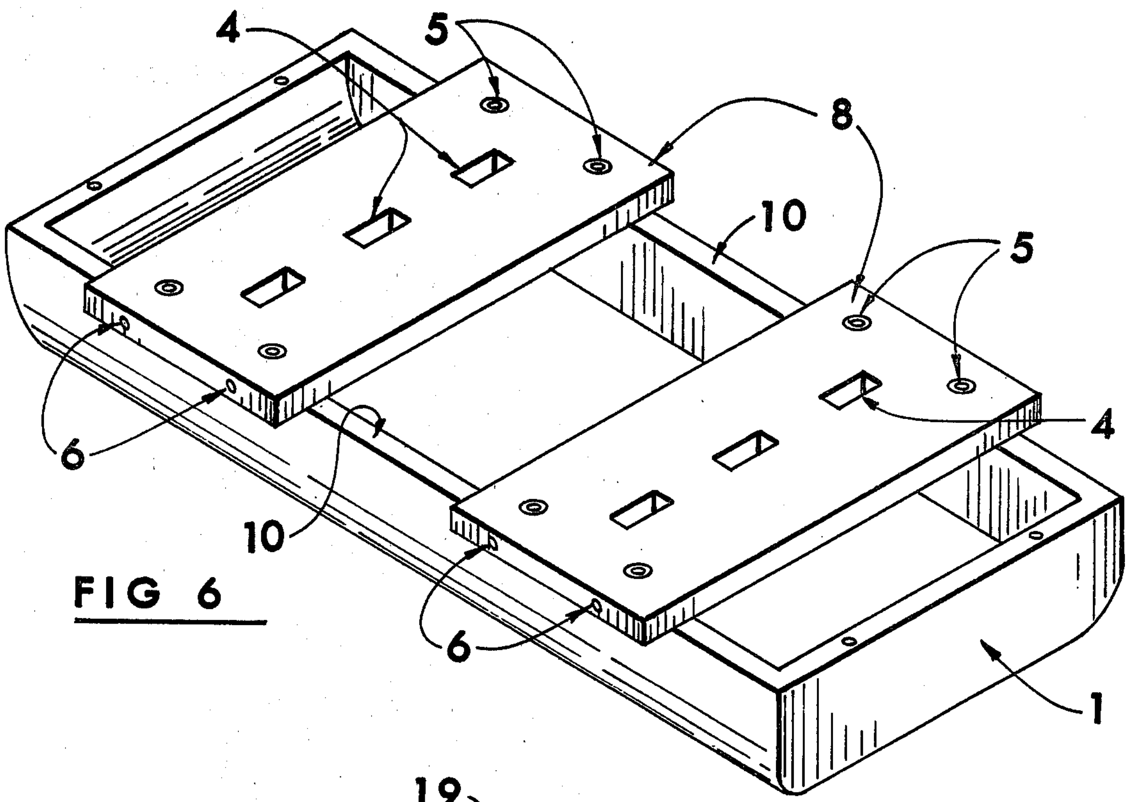
FIG. 6 is a section of pontoon bridge shown assembled.

FIG. 6 shows a section of pontoon bridge assembled for use. The pontoon roof 1 of FIG. 1 has been removed from the truck 2 to form the pontoon float of FIG. 6. The bullet resisting sides 8 of FIG. 1 have been removed from the truck 2 to form the pontoon decking of FIG. 6. The bolts that hold the bullet resisting pontoon decking 8 on the truck 2 are used to bolt the pontoon decking 8 on the pontoon float. Threaded holes 6 in the gunwale 10 of the pontoon float 1 will receive the bolts 5 of the pontoon decking 8.

Figure 4:
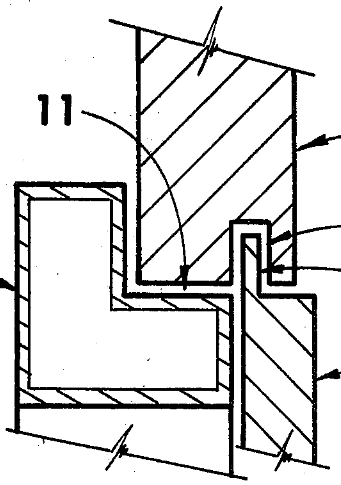
FIG. 4 is a cross section of the support structure, pontoon gunwale, and edge of the bridge decking at a point where they come together.

FIG. 4 shows a cross section of the support structure 9, inverted gunwale, and top edge of the bullet resisting pontoon decking 8 when they form a weather resistant cover for the cargo box 14.

The support structure 9 has a recess at 11 that supports the inverted gunwale 10 of the pontoon 1. The top edge of the bullet resisting pontoon decking 8 has a tongue 12 that fits into a groove 13 in the gunwale 10.

In FIG. 5 with the section of pontoon bridge removed from the support structure 9 a canvas cover (not shown) can be thrown over and secured to the support structure to protect any cargo in the cargo box 14.

Figure 7:
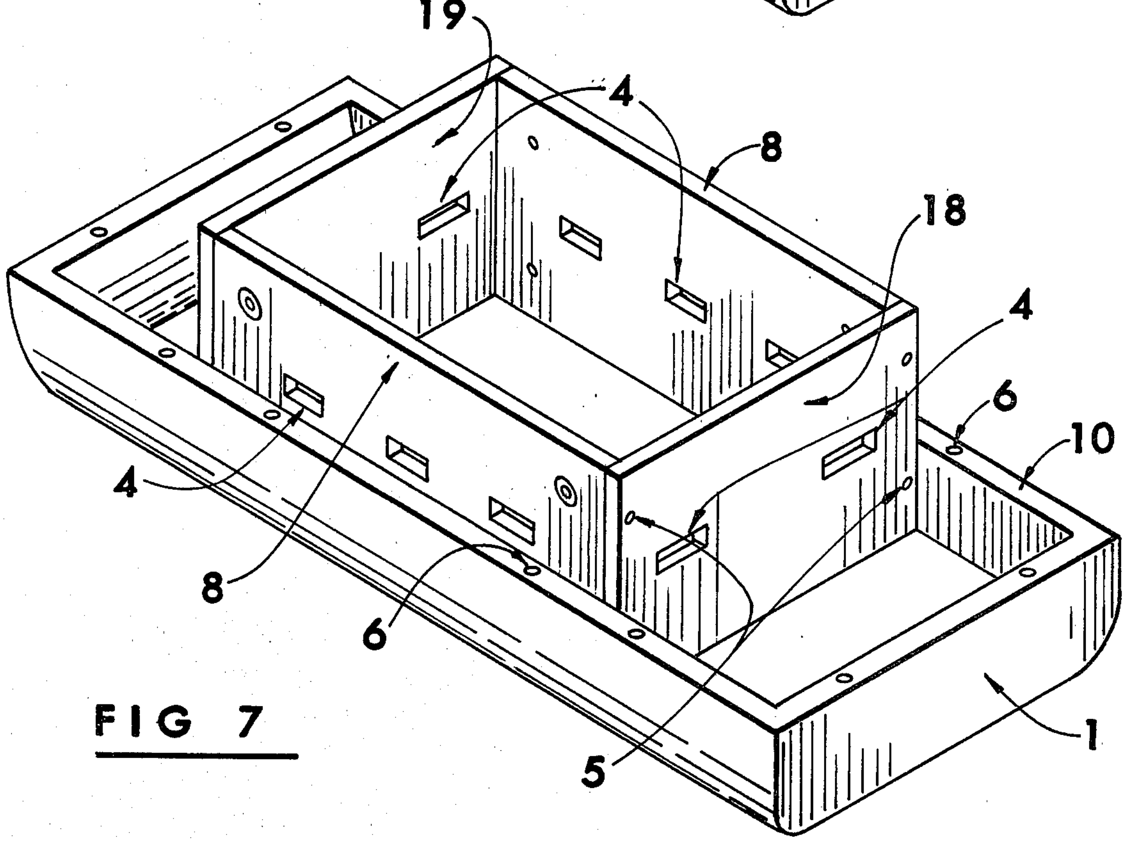
FIG. 7 is a section of pontoon bridge shown assembled into a assault boat.

FIG. 2 and FIG. 3 are end views of FIG. 1 and show a bullet resistant panel 18 applied to the tailgate 16 of the truck box 14. Bolts 5 can be seen holding the panel 18 to the tailgate 16. The tailgate 16 of the truck box 14 is hinged 7 at its bottom edge, so in turn the bullet resistant panel 18 bolted to the tailgate 16 hinges with it for access to the cargo box 14. The tailgate can be seen in FIG. 5. The front end of the cargo box 17 is covered with a bullet resistant panel 19 the same dimension as the tailgate panel 18. FIG. 7 shows the bullet resistant panels 8, 18, 19, bolted together to form an open top box or cabin. The cabin is shown inserted in the pontoon 1 to form an armored assault boat. The side panels 8 have threaded holes 6 in their ends as shown in FIGS. 2, 3, and 6. FIG. 7 shows bolts 5 inserted through the end panels 18, 19 into the ends of the side panels 8 to hold the box or cabin together.

With an outboard motor (not shown) applied to the stern of the pontoon 1 an armored-motorized assault boat is produced from a section of pontoon bridge.

What is claimed is:

1. A protective cover for a military vehicle, said vehicle having a cargo box with at least four apertures for receiving cargo support structure, said protective cover comprising:

a support structure of metal framework, said support structure having two longitudinally extending sides, two laterally extending sides, and at least four depending legs, said legs being received in said cargo box apertures;

a recess in each of said longitudinally extending sides of said support structure;

at least two bullet resisting pontoon decking panels, said panels being fixed to said longitudinally extending sides of said support structure and to said vehicle cargo box, said panels having gun ports formed therein and a tongue formed thereon, said tongue extending upwardly and adjacent said recess when said panels are fixed to said longitudinally extending sides, and said cargo box;

a pontoon bridge section, said pontoon bridge section having a pair of gunwales, each said gunwale having a groove formed therein, said pontoon bridge section being placed upon said support structure such that each gunwale is received in one of said recesses and such that each panel tongue is received in one of said grooves.

2. A protective cover for a military vehicle as in claim 1 wherein said vehicle has a tailgate, and a bullet resisting pontoon decking panel is fixed to said tailgate.

3. A protective cover for a military vehicle as in claim 1 wherein said bullet resisting pontoon decking panels can be used to form a cabin on said pontoon bridge section so as to form an armored assault boat.

* * * * *